US012689926B2

(12) United States Patent
Takeda et al.

(10) Patent No.: US 12,689,926 B2
(45) Date of Patent: Jul. 21, 2026

(54) CROSS PHYSICAL UPLINK CONTROL CHANNEL GROUP CHANNEL STATE INFORMATION REPORT

(71) Applicant: QUALCOMM Incorporated, San Diego, CA (US)

(72) Inventors: Kazuki Takeda, Minato-ku (JP); Changhwan Park, San Diego, CA (US); Heechoon Lee, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 610 days.

(21) Appl. No.: 17/934,149

(22) Filed: Sep. 21, 2022

(65) Prior Publication Data

US 2023/0096317 A1      Mar. 30, 2023

Related U.S. Application Data

(60) Provisional application No. 63/261,931, filed on Sep. 30, 2021.

(51) Int. Cl.
*H04W 24/10* (2009.01)
*H04W 72/1268* (2023.01)
*H04W 72/54* (2023.01)

(52) U.S. Cl.
CPC ....... *H04W 24/10* (2013.01); *H04W 72/1268* (2013.01); *H04W 72/54* (2023.01)

(58) Field of Classification Search
CPC . H04W 24/10; H04W 72/1268; H04W 72/54; H04L 5/0053; H04L 5/0005; H04L 5/0094
See application file for complete search history.

(56) References Cited

U.S. PATENT DOCUMENTS

| | | | | |
|---|---|---|---|---|
| 2017/0279583 A1* | 9/2017 | Dinan | .................. | H04L 1/0026 |
| 2019/0364561 A1* | 11/2019 | Xiong | .................. | H04W 76/27 |
| 2020/0145167 A1* | 5/2020 | Jung | .................... | H04L 1/1861 |
| 2020/0350967 A1 | 11/2020 | Xu et al. | | |
| 2021/0250074 A1* | 8/2021 | Hosseini | ............. | H04B 7/0626 |

(Continued)

FOREIGN PATENT DOCUMENTS

CN            111800869 A        10/2020

OTHER PUBLICATIONS

Huawei et al., "Discussion on Requirements for PUCCH SCell Activation", 3GPP TSG-RAN WG4 Meeting # 99e, R4-2110345, 3rd Generation Partnership Project, Mobile Competence Centre, 650, Route Des Lucioles, F-06921 Sophia-Antipolis Cedex, France, vol. RAN WG4, No. Electronic Meeting, May 19, 2021-May 27, 2021 May 11, 2021, XP052008908, pp. 1-7, section 2.2, figure 1.

(Continued)

*Primary Examiner* — Liem H. Nguyen
(74) *Attorney, Agent, or Firm* — Harrity & Harrity, LLP

(57) ABSTRACT

Various aspects of the present disclosure generally relate to wireless communication. In some aspects, a user equipment (UE) may measure a channel state information reference signal for a downlink cell associated with a first physical uplink control channel (PUCCH) group. The UE may report measurement information associated with channel state information reference signal using an uplink cell of a second PUCCH group associated with the first PUCCH group. Numerous other aspects are described.

30 Claims, 14 Drawing Sheets

400

(56) References Cited

U.S. PATENT DOCUMENTS

| | | | | |
|---|---|---|---|---|
| 2022/0022189 A1* | 1/2022 | Huang | ................... | H04L 5/0053 |
| 2022/0124741 A1* | 4/2022 | Elshafie | ................ | H04L 5/0094 |
| 2022/0158794 A1* | 5/2022 | Zhang | ................ | H04W 52/325 |
| 2022/0182899 A1* | 6/2022 | Li | ......................... | H04W 72/21 |
| 2022/0346086 A1* | 10/2022 | Aiba | .................... | H04L 5/0094 |
| 2023/0291455 A1* | 9/2023 | Xu | ......................... | H04B 7/022 |
| 2023/0319607 A1* | 10/2023 | Da Silva | ............... | H04W 24/08 |
| | | | | 370/242 |
| 2024/0163699 A1* | 5/2024 | Cui | ....................... | H04W 72/21 |
| 2024/0275567 A1* | 8/2024 | Babaei | ................. | H04W 76/28 |

OTHER PUBLICATIONS

International Search Report and Written Opinion—PCT/US2022/076882—ISA/EPO—Dec. 2, 2022.
NTT Docomo et al., "Discussions on PUCCH SCell Activation/Deactivation Delay Requirements", 3GPP TSG-RAN WG4 Meeting #100-e, R4-2112053, 3rd Generation Partnership Project, Mobile Competence Centre, 650, Route Des Lucioles, F-06921 Sophia-Antipolis Cedex, France, vol. RAN WG4, No. Electronic Meeting, Aug. 16, 2021-Aug. 27, 2021 Aug. 5, 2021, XP052032930, 7 Pages, section 2.2.
Taiwan Search Report—TW111136121—TIPO—Mar. 4, 2026.

* cited by examiner

500

510 — Measure a channel state information reference signal for a downlink cell associated with a first PUCCH group 520 — Report measurement information associated with channel state information reference signal using an uplink cell of a second PUCCH group associated with the first PUCCH group

600

610 Transmit a channel state information reference signal for a downlink cell associated with a first PUCCH group 620 Receive a report of measurement information associated with channel state information reference signal using an uplink cell of a second PUCCH group associated with the first PUCCH group

CROSS PHYSICAL UPLINK CONTROL CHANNEL GROUP CHANNEL STATE INFORMATION REPORT

CROSS-REFERENCE TO RELATED APPLICATION

This Patent Application claims priority to U.S. Provisional Patent Application No. 63/261,931, filed on Sep. 30, 2021, entitled "CROSS PHYSICAL UPLINK CONTROL CHANNEL GROUP CHANNEL STATE INFORMATION REPORT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for cross physical uplink control channel group channel state information report.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include measuring a channel state information reference signal for a downlink cell associated with a first physical uplink control channel (PUCCH) group. The method may include reporting measurement information associated with channel state information reference signal using an uplink cell of a second PUCCH group associated with the first PUCCH group.

Some aspects described herein relate to a method of wireless communication performed by a network node. The method may include transmitting a channel state information reference signal for a downlink cell associated with a first PUCCH group. The method may include receiving a report of measurement information associated with channel state information reference signal using an uplink cell of a second PUCCH group associated with the first PUCCH group.

Some aspects described herein relate to a UE for wireless communication. The user equipment may include a memory and one or more processors coupled to the memory. The one or more processors may be configured to measure a channel state information reference signal for a downlink cell associated with a first PUCCH group. The one or more processors may be configured to report measurement information associated with channel state information reference signal using an uplink cell of a second PUCCH group associated with the first PUCCH group.

Some aspects described herein relate to a network node for wireless communication. The network node may include a memory and one or more processors coupled to the memory. The one or more processors may be configured to transmit a channel state information reference signal for a downlink cell associated with a first PUCCH group. The one or more processors may be configured to receive a report of measurement information associated with channel state information reference signal using an uplink cell of a second PUCCH group associated with the first PUCCH group.

Some aspects described herein relate to a non-transitory computer-readable medium that stores a set of instructions for wireless communication by a UE. The set of instructions, when executed by one or more processors of the UE, may cause the UE to measure a channel state information reference signal for a downlink cell associated with a first PUCCH group. The set of instructions, when executed by one or more processors of the UE, may cause the UE to report measurement information associated with channel state information reference signal using an uplink cell of a second PUCCH group associated with the first PUCCH group.

Some aspects described herein relate to a non-transitory computer-readable medium that stores a set of instructions for wireless communication by a network node. The set of instructions, when executed by one or more processors of the network node, may cause the network node to transmit a channel state information reference signal for a downlink cell associated with a first PUCCH group. The set of instructions, when executed by one or more processors of the network node, may cause the network node to receive a report of measurement information associated with channel state information reference signal using an uplink cell of a second PUCCH group associated with the first PUCCH group.

Some aspects described herein relate to an apparatus for wireless communication. The apparatus may include means for measuring a channel state information reference signal for a downlink cell associated with a first PUCCH group. The apparatus may include means for reporting measurement information associated with channel state information reference signal using an uplink cell of a second PUCCH group associated with the first PUCCH group.

Some aspects described herein relate to an apparatus for wireless communication. The apparatus may include means for transmitting a channel state information reference signal for a downlink cell associated with a first PUCCH group. The apparatus may include means for receiving a report of measurement information associated with channel state information reference signal using an uplink cell of a second PUCCH group associated with the first PUCCH group.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
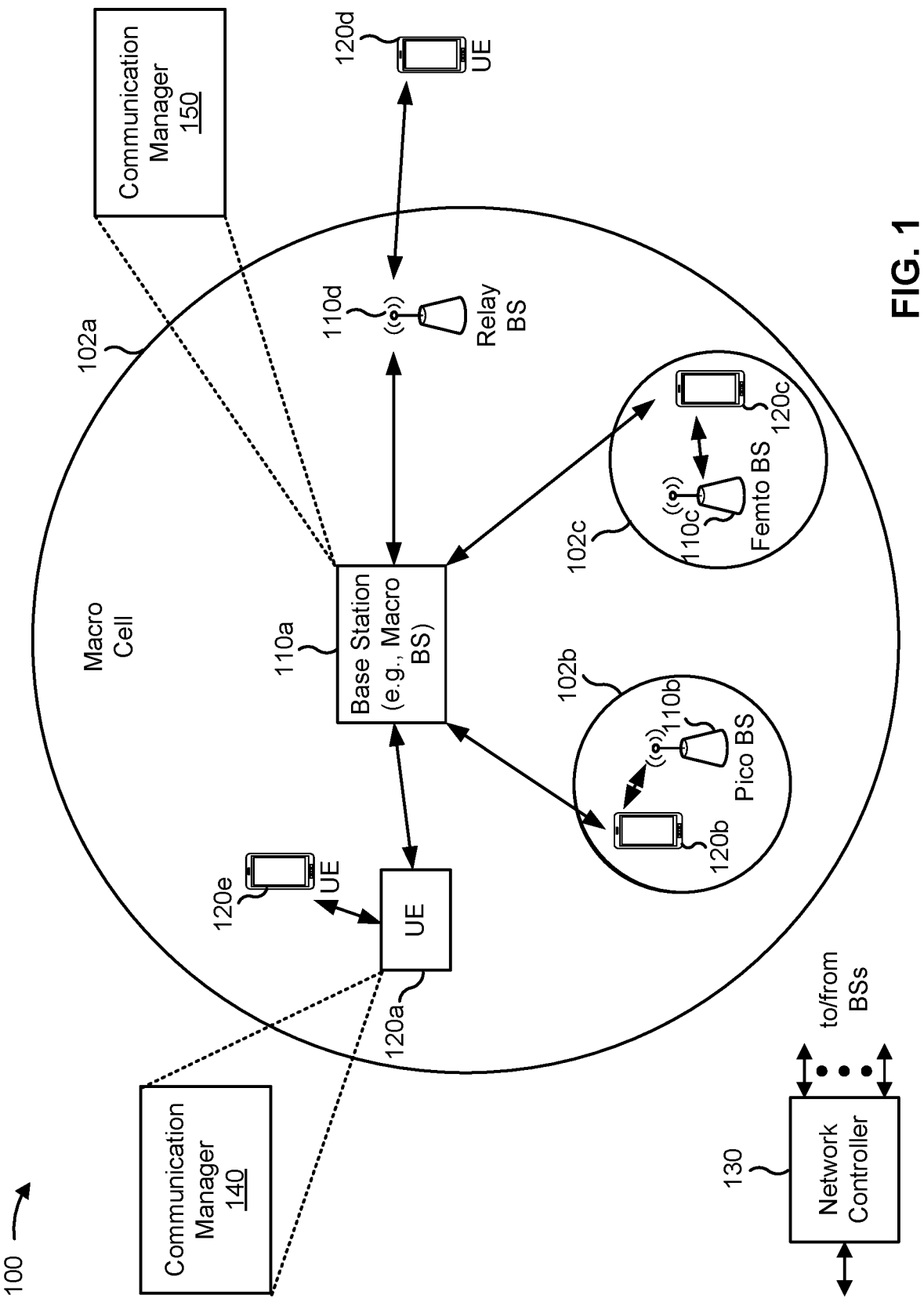
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V21) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may measure a channel state information reference signal for a downlink cell associated with a first PUCCH group; and report measurement information associated with channel state information reference signal using an uplink cell of a second PUCCH group associated with the first PUCCH group.

Additionally, or alternatively, the communication manager 140 may perform one or more other operations described herein.

In some aspects, the base station 110 (e.g., which may be a network node) may include a communication manager 150. As described in more detail elsewhere herein, the communication manager 150 may transmit a channel state information reference signal for a downlink cell associated with a first PUCCH group; and receive a report of measurement information associated with channel state information reference signal using an uplink cell of a second PUCCH group associated with the first PUCCH group. Additionally, or alternatively, the communication manager 150 may perform one or more other operations described herein.

As indicated above, FIG. 1 is provided as an example. Other examples may differ from what is described with regard to FIG. 1.

Figure 2:
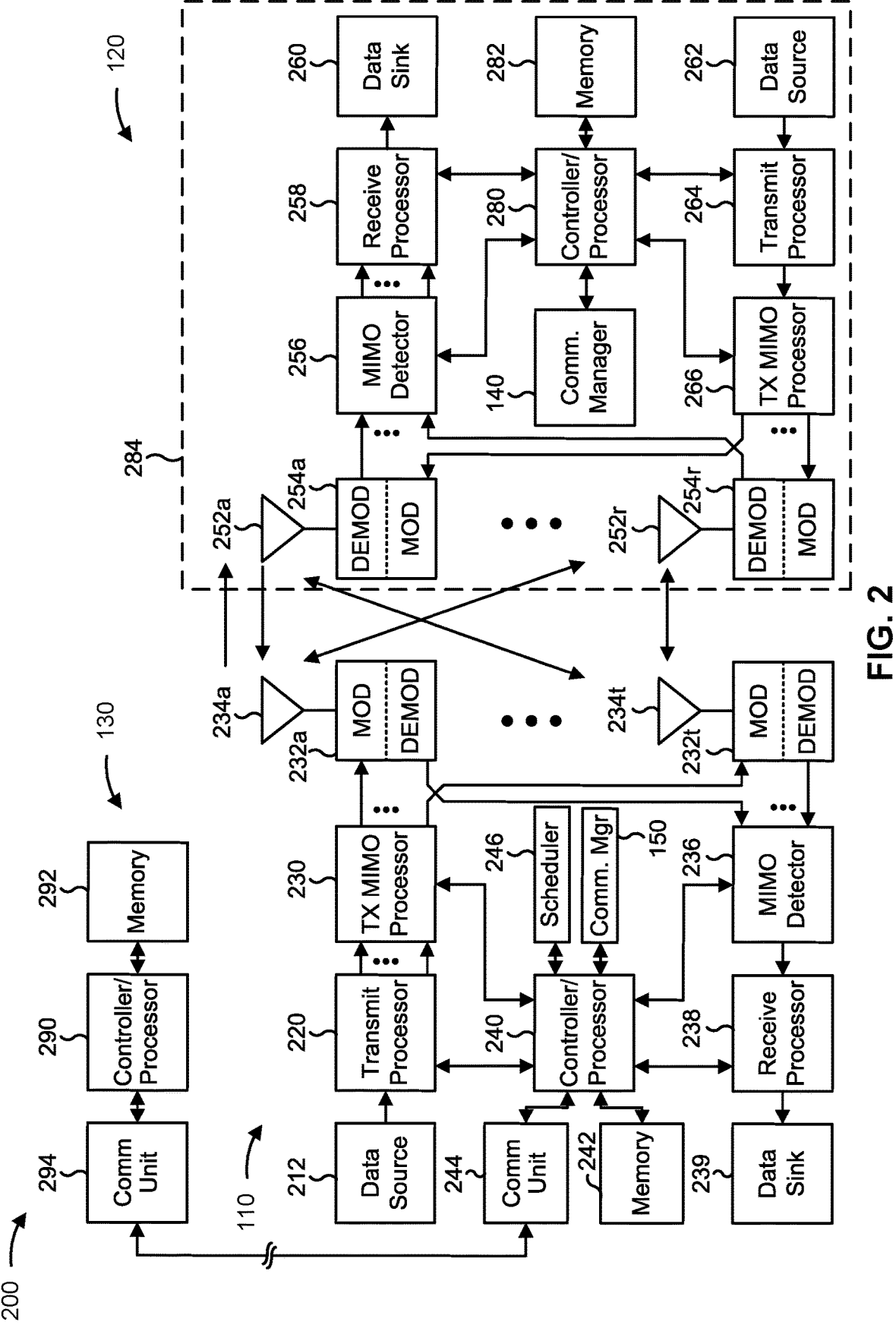
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-8).

The controller/processor 240 of the base station 110, the controller/processor 280 of the UE 120, and/or any other component(s) of FIG. 2 may perform one or more techniques associated with cross PUCCH group channel state information (CSI) reporting, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE 120 includes means for measuring a channel state information reference signal for a downlink cell associated with a first PUCCH group; and/or means for reporting measurement information associated with channel state information reference signal using an uplink cell of a second PUCCH group associated with the first PUCCH group. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the base station 110) includes means for transmitting a channel state information reference signal for a downlink cell associated with a first PUCCH group; and/or means for receiving a report of measurement information associated with channel state information reference signal using an uplink cell of a second PUCCH group associated with the first PUCCH group. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
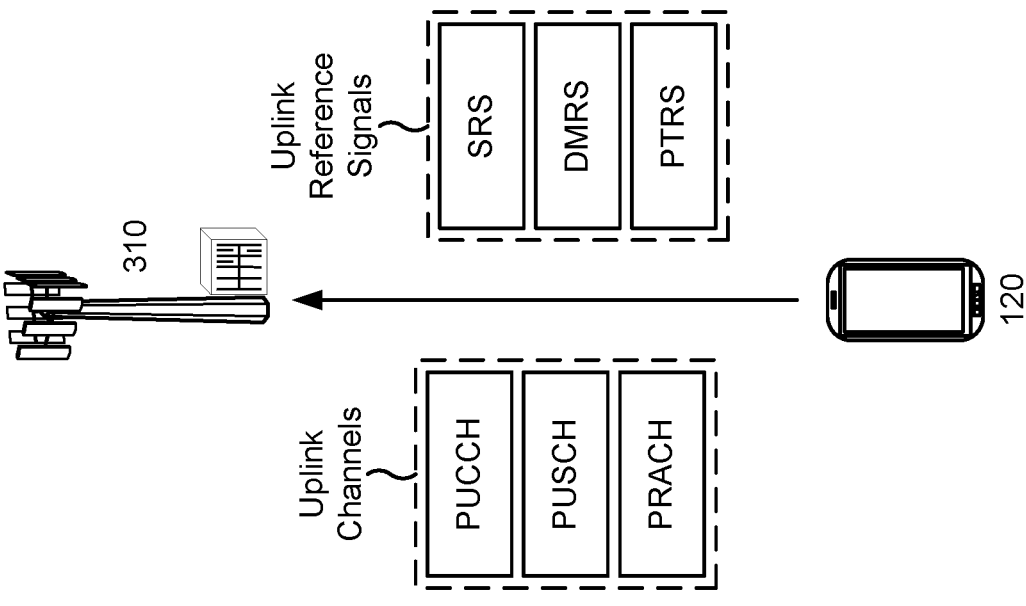
FIG. 3 is a diagram illustrating an example of physical channels and reference signals in a wireless network, in accordance with the present disclosure.
Figure 3:
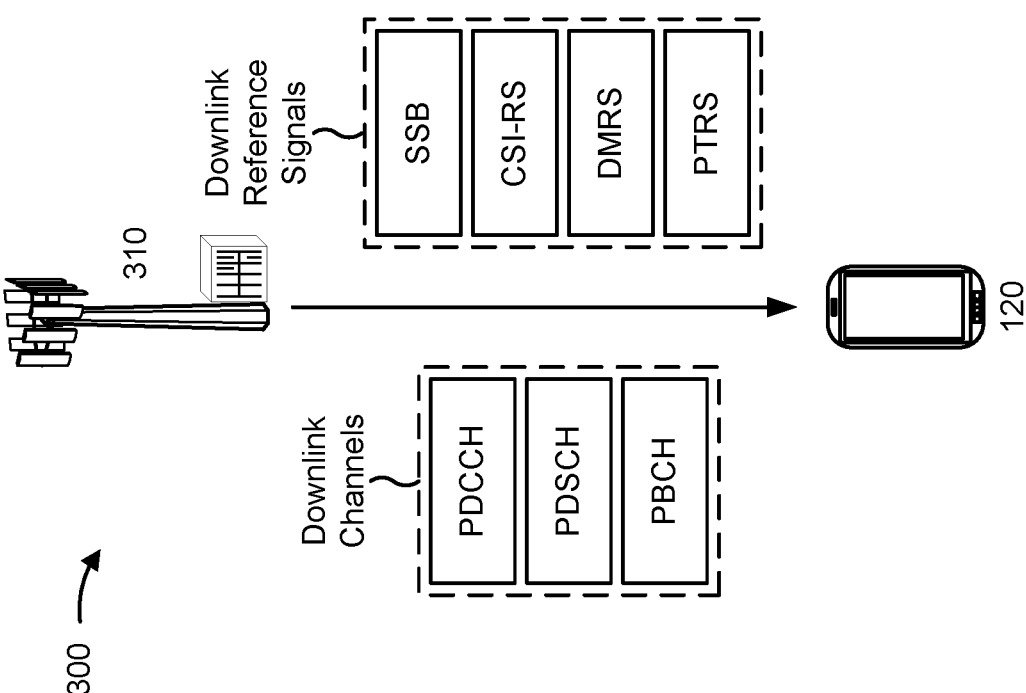

FIG. 3 is a diagram illustrating an example 300 of physical channels and reference signals in a wireless network, in accordance with the present disclosure. As shown in FIG. 3, downlink channels and downlink reference signals may carry information from a network node 310 to a UE 120, and uplink channels and uplink reference signals may carry information from a UE 120 to a network node 310.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a PUCCH that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH. For example, the UE may transmit a hybrid automatic repeat request (HARQ) ACK (HARQ-ACK) in UCI on a PUCCH or a PUSCH. In some cases, PUCCHs may be grouped into a set of PUCCH groups. For example, a network node 310 may provide a plurality of cells on a plurality of frequency bands (e.g., FR1 or FR2) and associate different cells with different PUCCHs and different PUCCH groups. In this case, the UE 120 may have access to a primary PUCCH group, which includes a primary cell (PCell), and a secondary PUCCH group, which includes a secondary cell (SCell).

As further shown, a downlink reference signal may include a synchronization signal block (SSB), a CSI reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network node 310 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 310 may configure a set of CSI-RSs for the UE 120, and the UE 120 may measure the configured set of CSI-RSs. Based at least in part on the measurements, the UE 120 may perform channel estimation and may report channel estimation parameters to the network node 310 (e.g., in a CSI report), such as a CQI, a precoding matrix indicator (PMI), a CSI-RS resource indicator (CRI), a layer indicator (LI), a rank indicator (RI), or an RSRP, among other examples. The network node 310 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise.

Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 310 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 310 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 310 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 310 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

As described above, a UE may communicate with a base station on a PCell or an SCell, among other examples. To activate an SCell, the UE and the base station may communicate to complete a PUCCH SCell activation procedure. Additional details regarding cell conditions associated with PUCCH SCell activation (e.g., cell conditions for classifying the PUCCH SCell as known or unknown) are described in 3GPP Technical Specification (TS) 38.133, Release 17, version 17.2.0, section 8.3.2. During an activation procedure, a UE may report beam information, which may be used to determine an SSB of a PDCCH for contention free random access (CFRA) (e.g., for timing advance (TA) updating when a timer associated with a TA group (TAG) that includes a target PUCCH SCell). Additionally, or alternatively, the beam information may be used for determining a transmission configuration indicator (TCI) state for a PDCCH or PDSCH on a target SCell, determining an uplink spatial relation for a PUCCH on a target SCell (e.g., for the FR2 band), or determining a receive beam for a PUCCH of a target SCell, among other examples. However, during PUCCH SCell activation under certain conditions (e.g., an unknown PUCCH SCell activation on FR1 or FR2 with or without a valid TA), the UE may be unable to report beam information to a base station via a PUCCH of a target SCell during a PUCCH SCell activation procedure.

Some aspects described herein enable cross PUCCH group CSI reporting. For example, a UE may measure a CSI-RS on a first cell of a first PUCCH group to determine beam information and may report CSI on a second cell of a second PUCCH group. In this case, the UE may report the CSI in a PUCCH or a PUSCH of the second PUCCH group. In this way, the UE and the base station may enable a PUCCH SCell activation procedure, thereby improving network operation flexibility and UE power consumption relative to a PUCCH SCell activation procedure not being enabled for the UE.

FIGS. 4A-4K are diagrams illustrating examples 400-460 associated with cross PUCCH group channel state information reporting, in accordance with the present disclosure. As shown in FIGS. 4A-4K, examples 400-460 include communication between a network node 402 and a UE 120. In some aspects, network node 402 and UE 120 may be included in a wireless network, such as wireless network 100. Network node 402 and UE 120 may communicate via a wireless access link, which may include an uplink and a downlink.

Figure 4A:
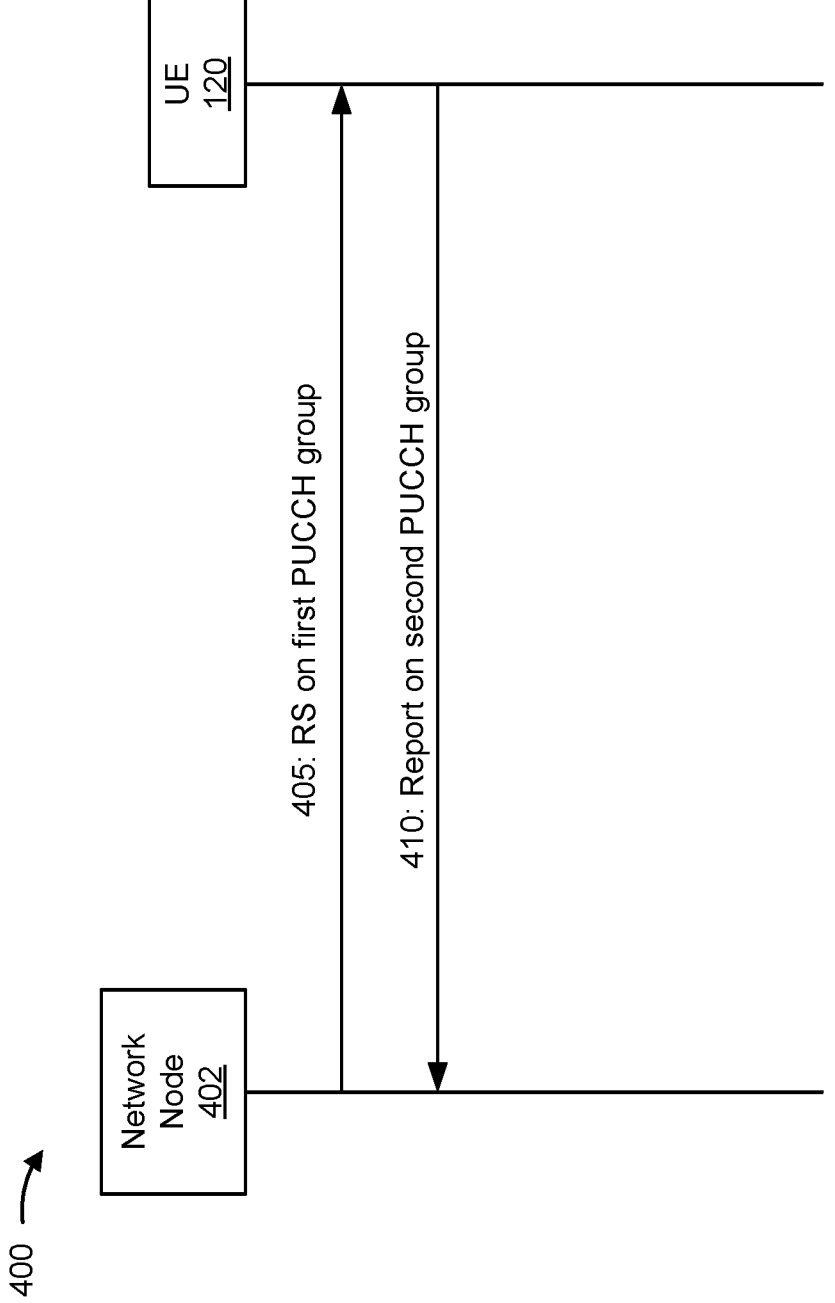
FIGS. 4A-4K are diagrams illustrating examples associated with cross physical uplink control channel (PUCCH) group channel state information (CSI) reporting, in accordance with the present disclosure.

As further shown in FIG. 4A, and by reference number 405, network node 402 may transmit a reference signal (RS) to UE 120. For example, UE 120 may receive a CSI-RS on a downlink of a first cell of a first PUCCH group. In some aspects, the CSI-RS may be associated with a particular type of CSI report. For example, network node 402 may transmit a CSI-RS associated with an aperiodic CSI (A-CSI) report, a periodic CSI (P-CSI) report, or a semi-persistent CSI (SP-CSI) report. In some aspects, UE 120 may receive the CSI-RS on a downlink of a secondary PUCCH group. For example, UE 120 may receive the CSI-RS using the secondary PUCCH group and determine to report CSI using a primary PUCCH group.

As further shown in FIG. 4A, and by reference number 410, UE 120 may transmit a report to network node 402. For example, UE 120 may transmit, on an uplink of a second cell of a second PUCCH group, a CSI report identifying beam information for the first cell of the first PUCCH group. In some aspects, UE 120 may transmit the report of the beam information (e.g., the CSI report) on a particular type of channel. For example, UE 120 may transmit the report of the beam information using PUCCH resources or PUSCH resources, among other examples. In some aspects, UE 120 may multiplex another message with the report of the beam information when transmitting the report of the beam information. For example, UE 120 may multiplex UCI (e.g., a HARQ-ACK) with the beam information for transmission to network node 402. Additionally, or alternatively, UE 120 may drop another communication in connection with transmitting the report of the beam information.

Figure 4C:
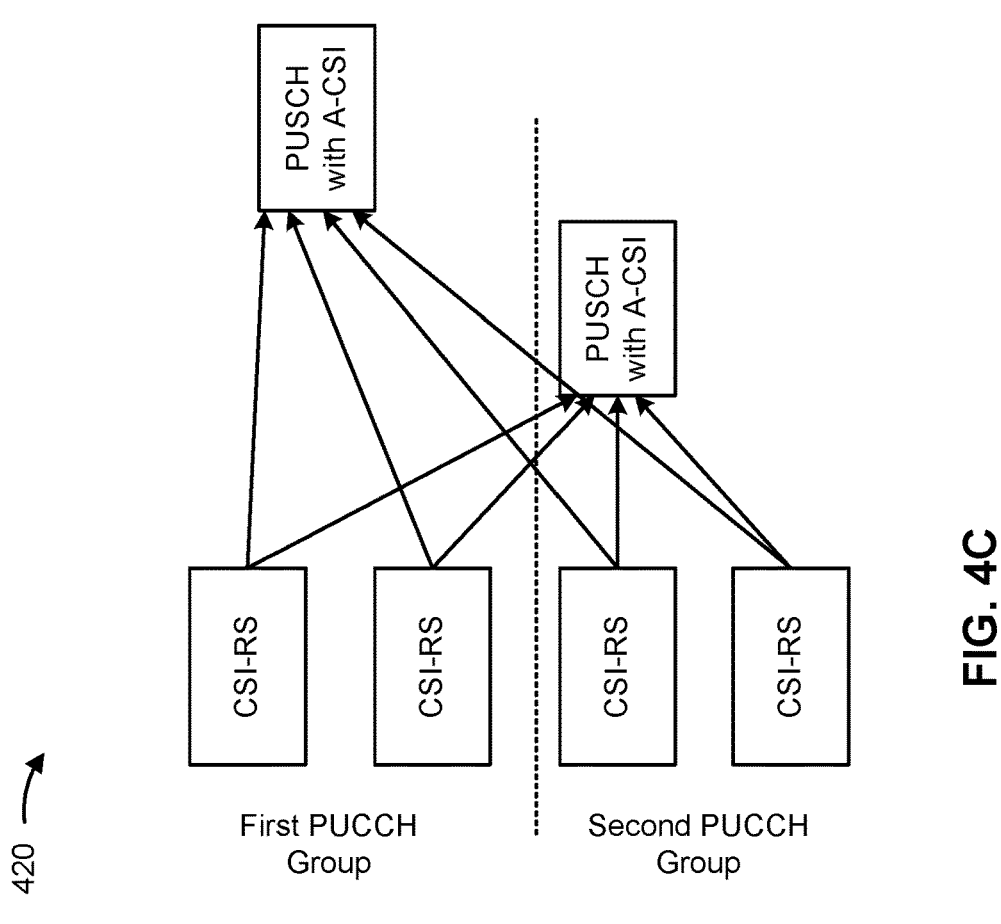
Figure 4B:
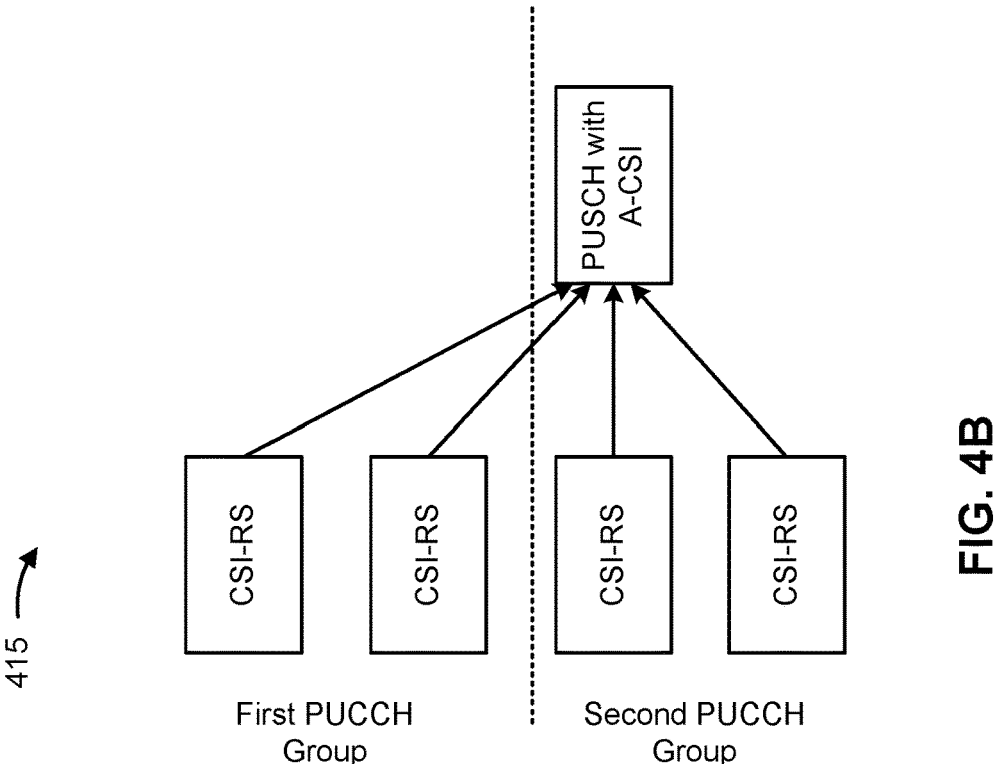

As shown in FIG. 4B, and by reference number 415, UE 120 may report CSI-RS received using a first PUCCH group on a PUSCH resource of a second PUCCH group. For example, UE 120 may be scheduled (e.g., by network node 402 using a CSI-AperiodicTriggerStateList parameter, which may identify a set of CSI-RS resources sets for downlink cells in different PUCCH groups) to receive one or more first CSI-RSs in the first PUCCH group and one or more second CSI-RSs in the second PUCCH group. In this case, UE 120 may be scheduled (e.g., by network node 402) with PUSCH resources for reporting A-CSI, and the UE 120 may use the PUSCH resources in the second PUCCH group to transmit a report of the one or more first CSI-RSs received in the first PUCCH group. In some aspects, the PUSCH resources may be a single PUSCH resource with A-CSI across all uplink carriers across the two PUCCH groups.

Additionally, or alternatively, as shown in FIG. 4C, and by reference number 420, UE 120 may be configured to report CSI in PUSCH resources in both the first PUCCH group and the second PUCCH group. For example, UE 120 may be scheduled with non-overlapping PUSCH resources for reporting A-CSI and may report measurement information associated with received CSI-RS across PUCCH groups using the non-overlapping PUSCH resources. In other words, UE 120 may report beam information for the second PUCCH group in a PUSCH with A-CSI resources of the first PUCCH group and may report beam information for the first PUCCH group in a PUSCH with A-CSI resources of the second PUCCH group.

Figure 4E:
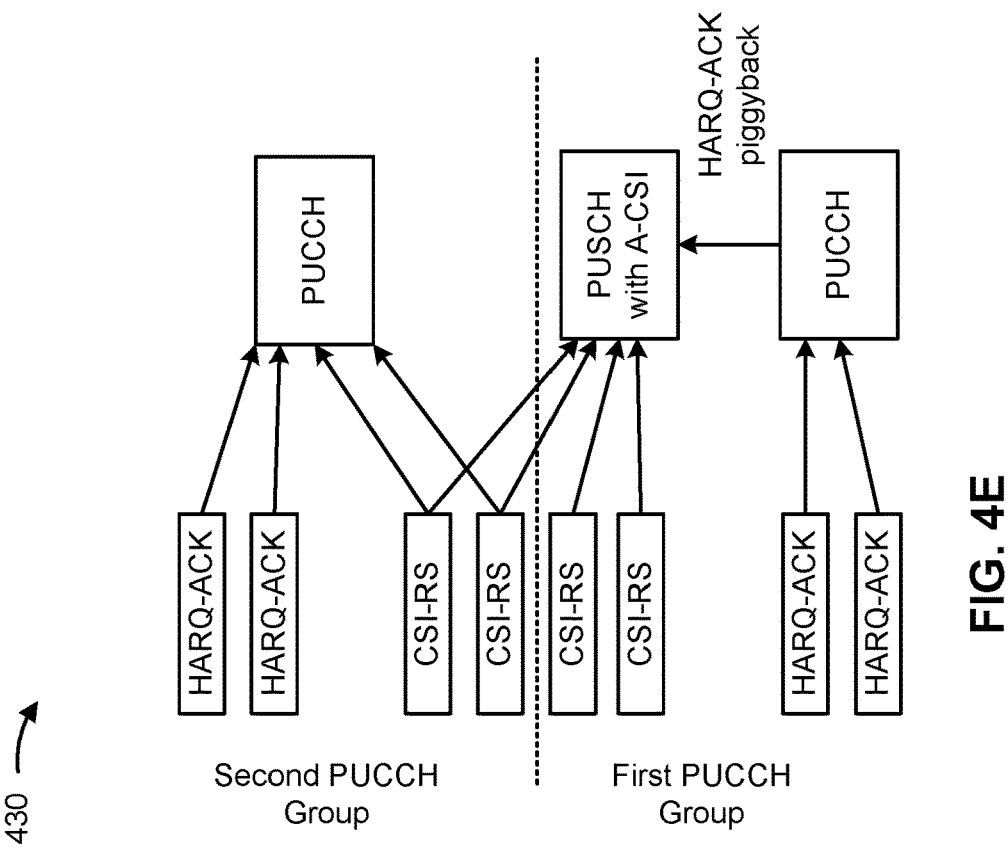
Figure 4D:
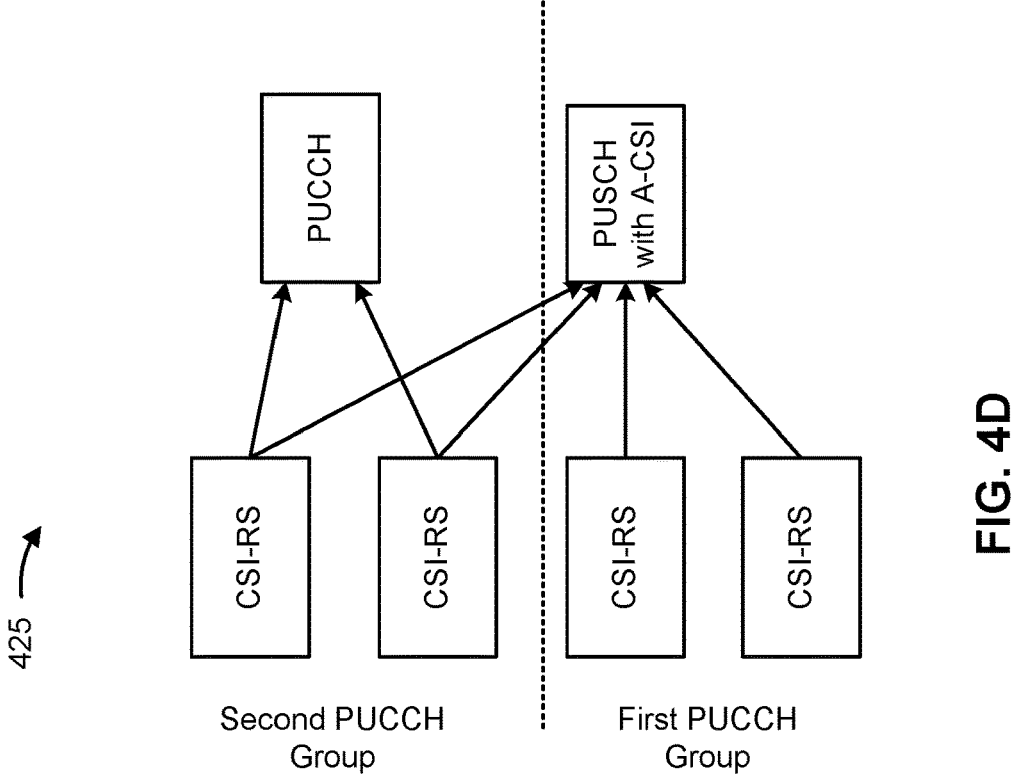

Additionally, or alternatively, as shown in FIG. 4D, and by reference number 425, UE 120 may be configured to report different types of CSI concurrently. For example, UE 120 may report A-CSI across PUCCH groups (e.g., an A-CSI report regarding CSI-RSs in the second PUCCH group may be reported in PUSCH resources of the first PUCCH group) and within a PUCCH group (e.g., a P-CSI report regarding CSI-RSs of the second PUCCH group may be reported in PUCCH resources of the second PUCCH group).

Additionally, or alternatively, as shown in FIG. 4E, and by reference number 430, UE 120 may multiplex HARQ-ACK feedback with a report of beam information. For example, UE 120 may transmit HARQ-ACK on a PUCCH or PUSCH within the same PUCCH group for which the HARQ-ACK applies. In this case, UE 120 may multiplex HARQ-ACK feedback of a PUCCH in the first PUCCH group with A-CSI reporting that is cross PUCCH group (e.g., that relates to a CSI-RS of the second PUCCH group) to transmit using PUSCH resources.

Figures 4F, 4G:
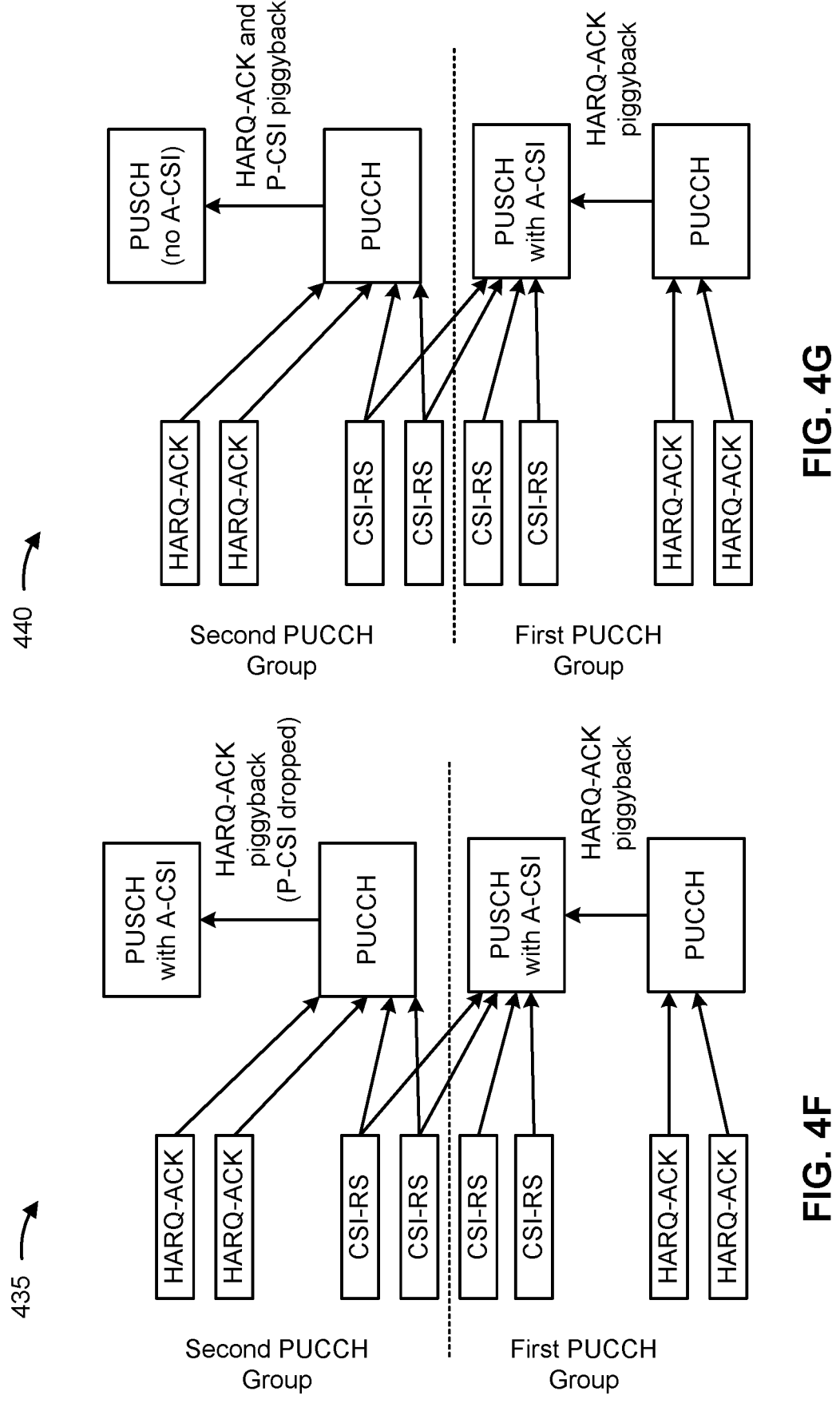

Additionally, or alternatively, as shown in FIG. 4F, and by reference number 435, when PUSCH resources in the second PUCCH group include A-CSI reporting, UE 120 may drop P-CSI reporting from being multiplexed from a PUCCH onto a PUSCH. In this case, UE 120 may drop the P-CSI reporting, which may include canceling or delaying transmission of beam information associated with the P-CSI reporting. In contrast, as shown in FIG. 4G, and by reference number 440, when the PUSCH resources do not include A-CSI, UE 120 may multiplex HARQ-ACK and P-CSI feedback onto the PUSCH resources for the second PUCCH group.

Figures 4H, 4I:
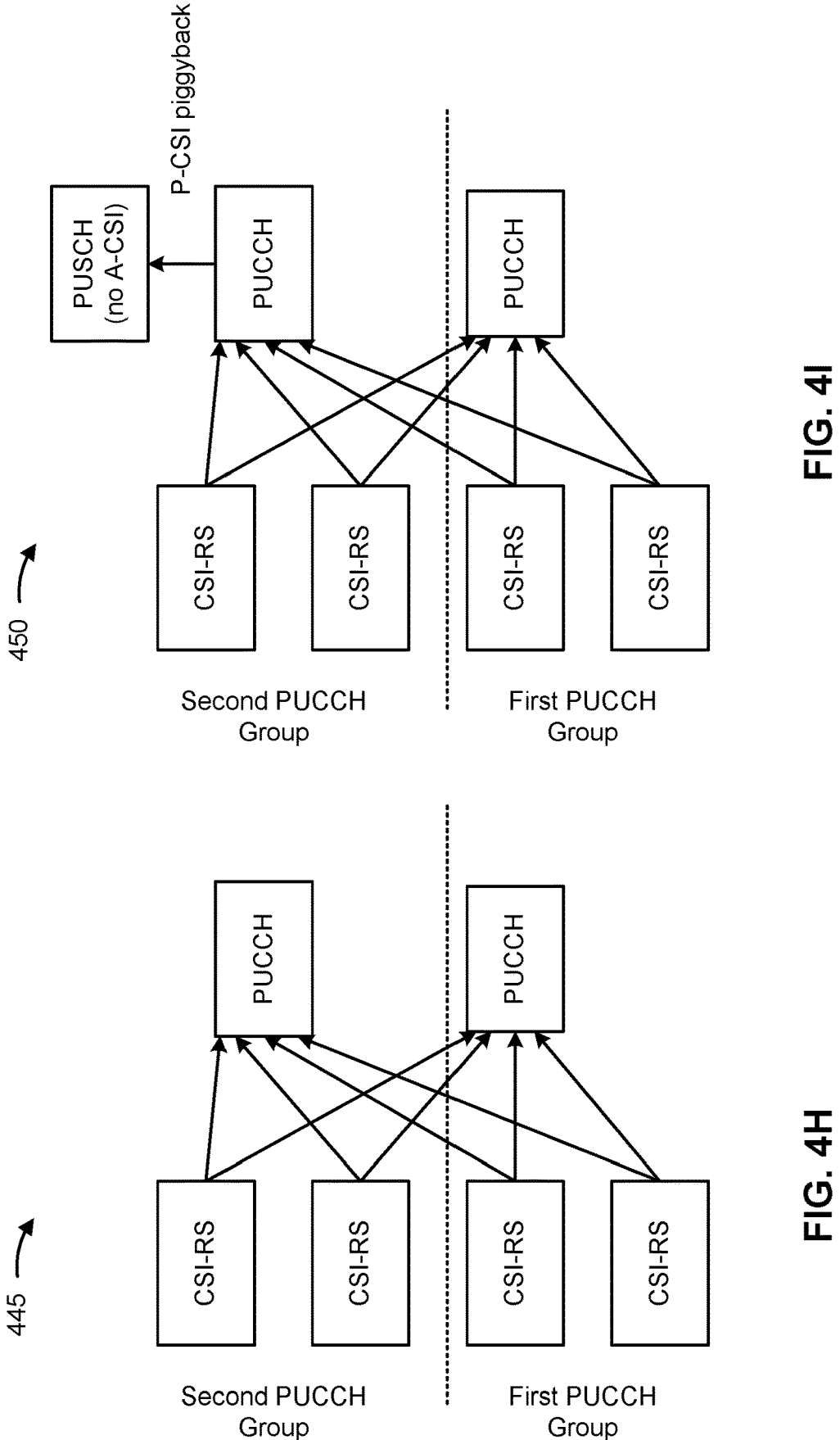
Figures 4J, 4K:
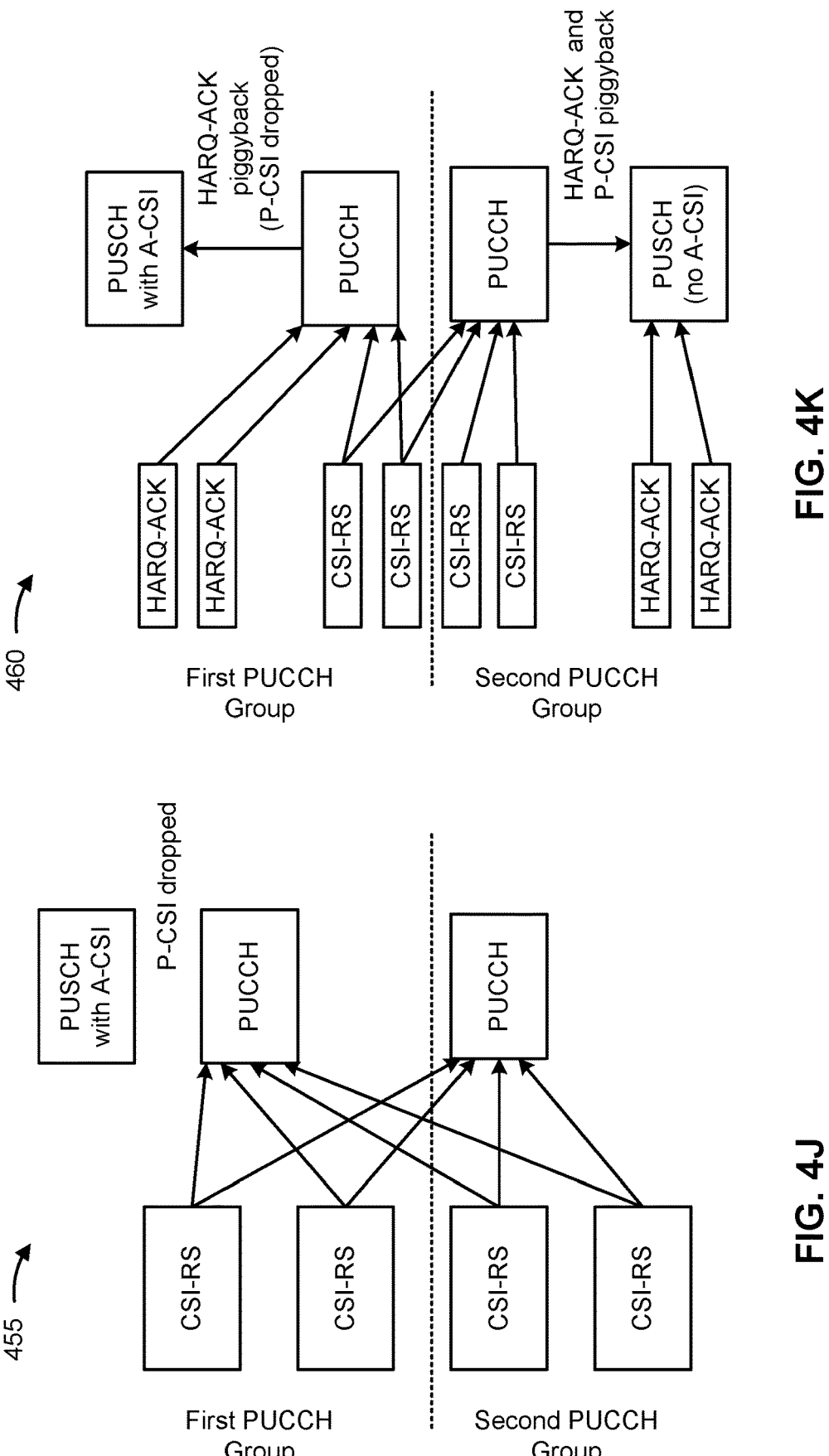

In some aspects, as shown in FIG. 4H, and by reference number 445, UE 120 may be configured for concurrent P-CSI reporting. For example, when UE 120 is configured with concurrent PUCCH resources associated with the two PUCCH groups, UE 120 may report cross PUCCH P-CSI for the CSI-RSs of the two PUCCH groups. In this case, as shown in FIG. 4I, and by reference number 450, when UE 120 is scheduled with PUSCH resources without A-CSI concurrent with the PUCCH resource in the second PUCCH group, UE 120 may multiplex the P-CSI reporting onto the PUSCH resources. In contrast, as shown in FIG. 4J, and by reference number 455, UE 120 may drop the P-CSI from transmission using the PUCCH resources when the PUSCH resources include A-CSI reporting. In another example, UE 120 may multiplex HARQ-ACK feedback onto a PUSCH. For example, as shown in FIG. 4K, and by reference number 460, UE 120 may multiplex HARQ-ACK feedback onto the PUSCH with A-CSI reporting from which P-CSI reporting is dropped, and the UE 120 may multiplex HARQ-ACK feedback onto the PUSCH that does not include A-CSI reporting but onto which the P-CSI reporting is multiplexed. In these cases, P-CSI dropping or multiplexing is on a per PUCCH group basis, and HARQ-ACK multiplexing is limited to cells in the same PUCCH group.

As indicated above, FIGS. 4A-4K are provided as examples. Other examples may differ from what is described with respect to FIGS. 4A-4K.

Figure 5:
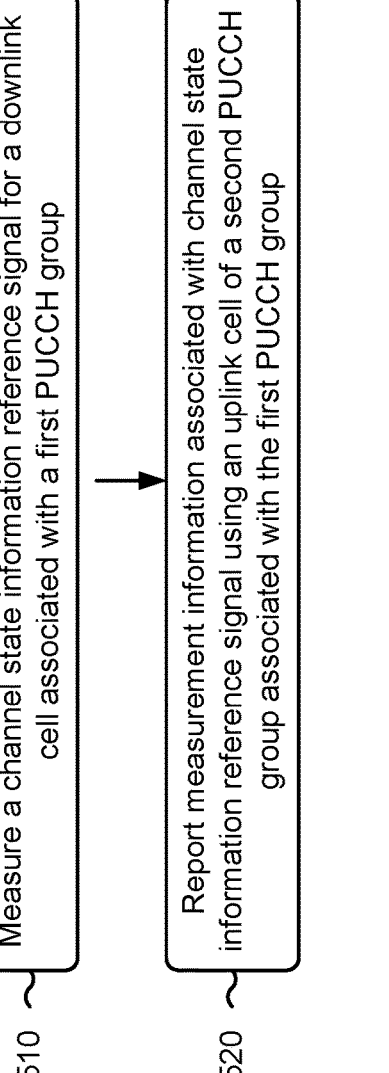
FIGS. 5-6 are diagrams illustrating example processes associated with cross PUCCH group CSI reporting, in accordance with the present disclosure.

FIG. 5 is a diagram illustrating an example process 500 performed, for example, by a UE, in accordance with the present disclosure. Example process 500 is an example where the UE (e.g., UE 120) performs operations associated with cross PUCCH group CSI reporting.

As shown in FIG. 5, in some aspects, process 500 may include measuring a channel state information reference signal for a downlink cell associated with a first PUCCH group (block 510). For example, the UE (e.g., using communication manager 140 and/or measurement component 708, depicted in FIG. 7) may measure a channel state information reference signal for a downlink cell associated with a first PUCCH group, as described above.

As further shown in FIG. 5, in some aspects, process 500 may include reporting measurement information associated with channel state information reference signal using an uplink cell of a second PUCCH group associated with the first PUCCH group (block 520). For example, the UE (e.g., using communication manager 140 and/or reporting component 710, depicted in FIG. 7) may report measurement information associated with channel state information reference signal using an uplink cell of a second PUCCH group associated with the first PUCCH group, as described above.

Process 500 may include additional aspects, such as any single aspect or any combination of aspects described below and/or in connection with one or more other processes described elsewhere herein.

In a first aspect, one of the first PUCCH group and the second PUCCH group is a primary PUCCH group and another of the first PUCCH group and the second PUCCH group is a secondary PUCCH group.

In a second aspect, alone or in combination with the first aspect, the measurement information is multiplexed with another communication on the uplink cell of the second PUCCH group.

In a third aspect, alone or in combination with one or more of the first and second aspects, a configuration of reporting the measurement information is based at least in part on radio resource control signaling.

In a fourth aspect, alone or in combination with one or more of the first through third aspects, the channel state information reference signal is associated with an aperiodic channel state information report or a semi-persistent channel state information report.

In a fifth aspect, alone or in combination with one or more of the first through fourth aspects, reporting the measurement information comprises reporting the measurement information on a physical uplink shared channel.

In a sixth aspect, alone or in combination with one or more of the first through fifth aspects, reporting the measurement information comprises multiplexing the measurement information with uplink control information on a per PUCCH group basis.

In a seventh aspect, alone or in combination with one or more of the first through sixth aspects, the uplink control information includes hybrid automatic repeat request feedback associated with the second PUCCH group.

In an eighth aspect, alone or in combination with one or more of the first through seventh aspects, the channel state information reference signal is associated with a periodic channel state information report or a semi-persistent channel state information report.

In a ninth aspect, alone or in combination with one or more of the first through eighth aspects, reporting the measurement information comprises reporting the measurement information on a physical uplink control channel.

In a tenth aspect, alone or in combination with one or more of the first through ninth aspects, reporting the measurement information comprises multiplexing the measurement information with uplink control information on a per PUCCH group basis.

In an eleventh aspect, alone or in combination with one or more of the first through tenth aspects, the measurement information is a first aperiodic channel state information reference signal report associated with a first PUCCH group, and wherein reporting of the first aperiodic channel state information reference signal report is in a first time resource that is disjoint from a second time resource for reporting of a second aperiodic channel state information reference signal report associated with a second PUCCH group.

In a twelfth aspect, alone or in combination with one or more of the first through eleventh aspects, the measurement information is a periodic channel state information reference signal report associated with a first PUCCH group, and wherein reporting of the periodic channel state information reference signal report is in a first time resource that is at least partially overlapping with a second time resource reporting of an aperiodic channel state information reference signal report associated with a second PUCCH group.

In a thirteenth aspect, alone or in combination with one or more of the first through twelfth aspects, the measurement information is a first periodic channel state information reference signal report associated with a first PUCCH group, and wherein reporting of the first periodic channel state information reference signal report is in a first time resource that is at least partially overlapping from a second time resource reporting of a second periodic channel state information reference signal report associated with a second PUCCH group.

In a fourteenth aspect, alone or in combination with one or more of the first through thirteenth aspects, a measurement of the channel state information reference signal for the downlink cell in the first PUCCH group is associated with a channel state information report on at least one PUCCH or PUSCH of at least one of the first PUCCH group or the second PUCCH group.

In a fifteenth aspect, alone or in combination with one or more of the first through fourteenth aspects, a report of at least one measurement of at least one channel state information reference signal for at least one downlink cell in at least one of the first PUCCH group or the second PUCCH group is reported on a physical uplink shared channel of an uplink cell associated with the first PUCCH group, wherein a hybrid automatic repeat request feedback message for the downlink cell is multiplexed with the report on the physical uplink shared channel of the uplink cell.

In a sixteenth aspect, alone or in combination with one or more of the first through fifteenth aspects, process 500 includes dropping at least one communication in connection with reporting the measurement information.

In a seventeenth aspect, alone or in combination with one or more of the first through sixteenth aspects, dropping the at least one communication comprises dropping the at least one communication based at least in part on a PUCCH group of the at least one communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
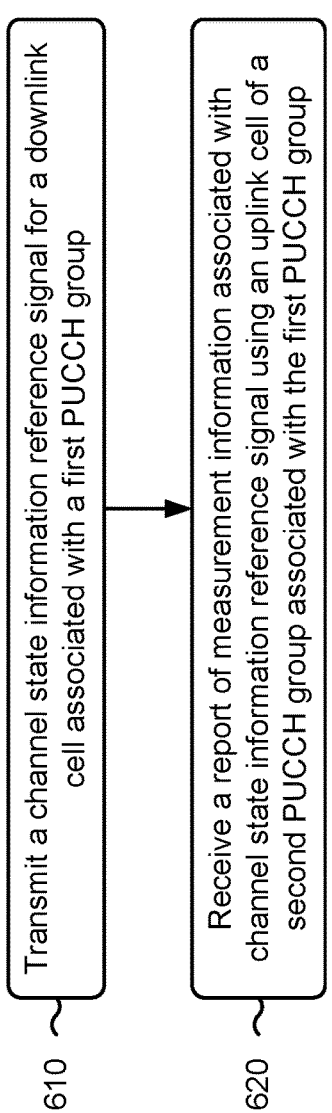

FIG. 6 is a diagram illustrating an example process 600 performed, for example, by a network node, in accordance with the present disclosure. Example process 600 is an example where the network node (e.g., base station 110, the network node 310, or the network node 402, among other examples) performs operations associated with cross PUCCH group CSI reporting.

As shown in FIG. 6, in some aspects, process 600 may include transmitting a channel state information reference signal for a downlink cell associated with a first PUCCH group (block 610). For example, the network node (e.g., using communication manager 150 and/or transmission component 804, depicted in FIG. 8) may transmit a channel state information reference signal for a downlink cell associated with a first PUCCH group, as described above.

As further shown in FIG. 6, in some aspects, process 600 may include receiving a report of measurement information associated with channel state information reference signal using an uplink cell of a second PUCCH group associated with the first PUCCH group (block 620). For example, the network node (e.g., using communication manager 150 and/or reception component 802, depicted in FIG. 8) may receive a report of measurement information associated with channel state information reference signal using an uplink cell of a second PUCCH group associated with the first PUCCH group, as described above.

Process 600 may include additional aspects, such as any single aspect or any combination of aspects described below and/or in connection with one or more other processes described elsewhere herein.

In a first aspect, one of the first PUCCH group and the second PUCCH group is a primary PUCCH group and another of the first PUCCH group and the second PUCCH group is a secondary PUCCH group.

In a second aspect, alone or in combination with the first aspect, the measurement information is multiplexed with another communication on the uplink cell of the second PUCCH group.

In a third aspect, alone or in combination with one or more of the first and second aspects, a configuration of the report of the measurement information is based at least in part on radio resource control signaling.

In a fourth aspect, alone or in combination with one or more of the first through third aspects, the channel state information reference signal is associated with an aperiodic channel state information report or a semi-persistent channel state information report.

In a fifth aspect, alone or in combination with one or more of the first through fourth aspects, receiving the report of the measurement information comprises receiving the report of the measurement information on a physical uplink shared channel.

In a sixth aspect, alone or in combination with one or more of the first through fifth aspects, receiving the report of the measurement information comprises receiving the report of the measurement information multiplexed with uplink control information on a per PUCCH group basis.

In a seventh aspect, alone or in combination with one or more of the first through sixth aspects, the uplink control information includes hybrid automatic repeat request feedback associated with the second PUCCH group.

In an eighth aspect, alone or in combination with one or more of the first through seventh aspects, the channel state information reference signal is associated with a periodic channel state information report or a semi-persistent channel state information report.

In a ninth aspect, alone or in combination with one or more of the first through eighth aspects, receiving the report of the measurement information comprises receiving the report of the measurement information on a physical uplink control channel.

In a tenth aspect, alone or in combination with one or more of the first through ninth aspects, receiving the report of the measurement information comprises receiving the report of the measurement information multiplexed with uplink control information on a per PUCCH group basis.

In an eleventh aspect, alone or in combination with one or more of the first through tenth aspects, the measurement information includes a first report of a first aperiodic channel state information reference signal associated with a first PUCCH group, and wherein the first report of the first aperiodic channel state information reference signal is in a first time resource that is disjoint from a second time resource for a second report of a second aperiodic channel state information reference signal associated with a second PUCCH group.

In a twelfth aspect, alone or in combination with one or more of the first through eleventh aspects, the measurement information includes a periodic channel state information reference signal report associated with a first PUCCH group, and wherein the periodic channel state information reference signal report is in a first time resource that is at least partially overlapping with a second time resource that conveys an aperiodic channel state information reference signal report associated with a second PUCCH group.

In a thirteenth aspect, alone or in combination with one or more of the first through twelfth aspects, the measurement information includes a first periodic channel state information reference signal report associated with a first PUCCH group, and wherein the first periodic channel state information reference signal report is conveyed in a first time resource that is at least partially overlapping from a second time resource that conveys a second periodic channel state information reference signal report associated with a second PUCCH group.

In a fourteenth aspect, alone or in combination with one or more of the first through thirteenth aspects, a measurement of the channel state information reference signal for the downlink cell in the first PUCCH group is associated with a channel state information report on at least one PUCCH or PUSCH of at least one of the first PUCCH group or the second PUCCH group.

In a fifteenth aspect, alone or in combination with one or more of the first through fourteenth aspects, at least one measurement of at least one channel state information reference signal for at least one downlink cell in at least one of the first PUCCH group or the second PUCCH group is reported on a physical uplink shared channel of an uplink cell associated with the first PUCCH group, wherein a hybrid automatic repeat request feedback message for the downlink cell is multiplexed with the at least one measurement on the physical uplink shared channel of the uplink cell.

In a sixteenth aspect, alone or in combination with one or more of the first through fifteenth aspects, at least one communication is dropped in connection with the report of the measurement information.

In a seventeenth aspect, alone or in combination with one or more of the first through sixteenth aspects, the at least one communication is dropped based at least in part on a PUCCH group of the at least one communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
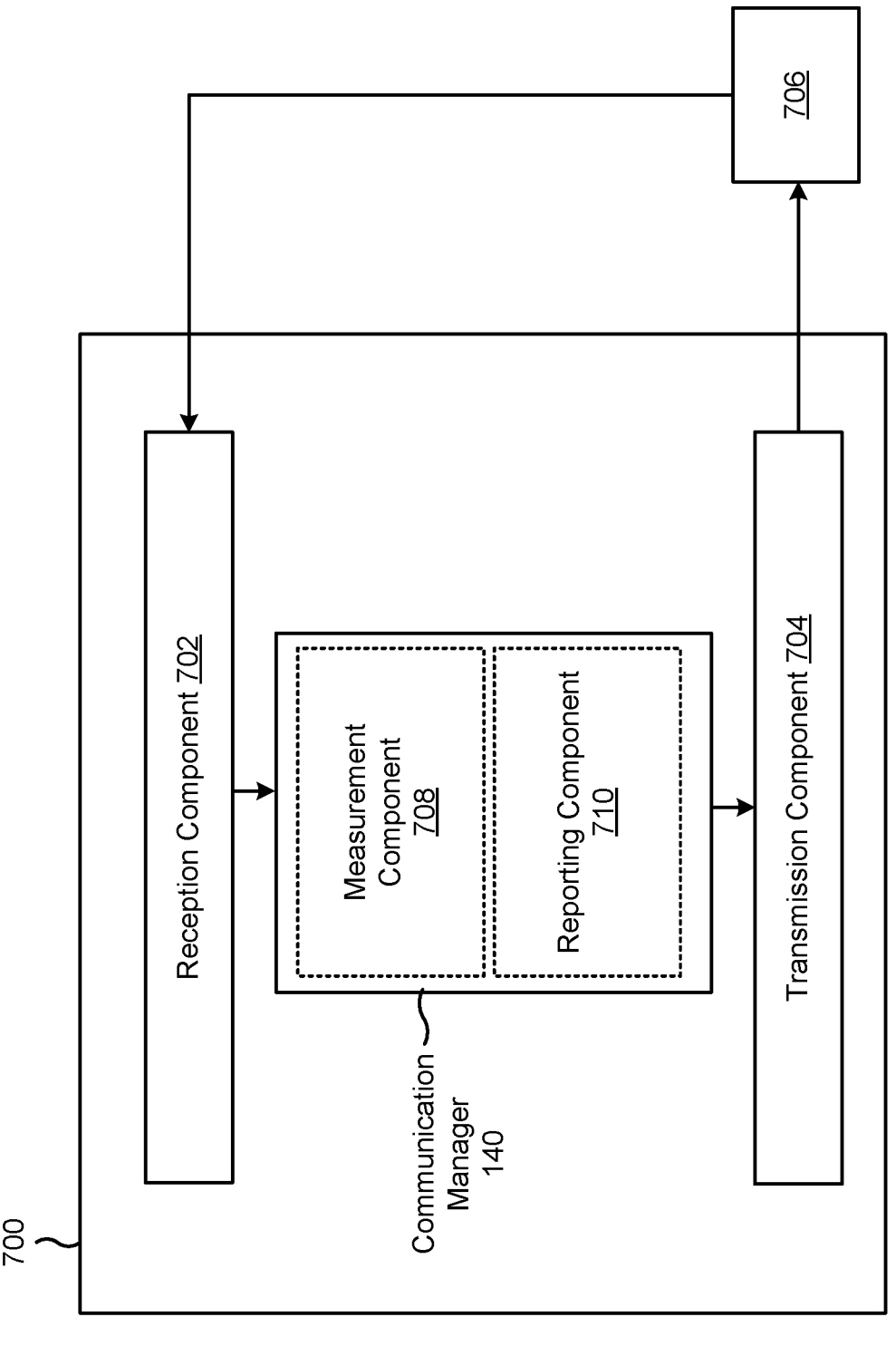
FIGS. 7-8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a measurement component 708 or a reporting component 710, among other examples.

In some aspects, the apparatus 700 may be configured to perform one or more operations described herein in connection with FIGS. 4A-4K. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The measurement component 708 may measure a channel state information reference signal for a downlink cell associated with a first PUCCH group. The reporting component 710 may report measurement information associated with channel state information reference signal using an uplink cell of a second PUCCH group associated with the first PUCCH group. The reporting component 710 may drop at least one communication in connection with reporting the measurement information.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
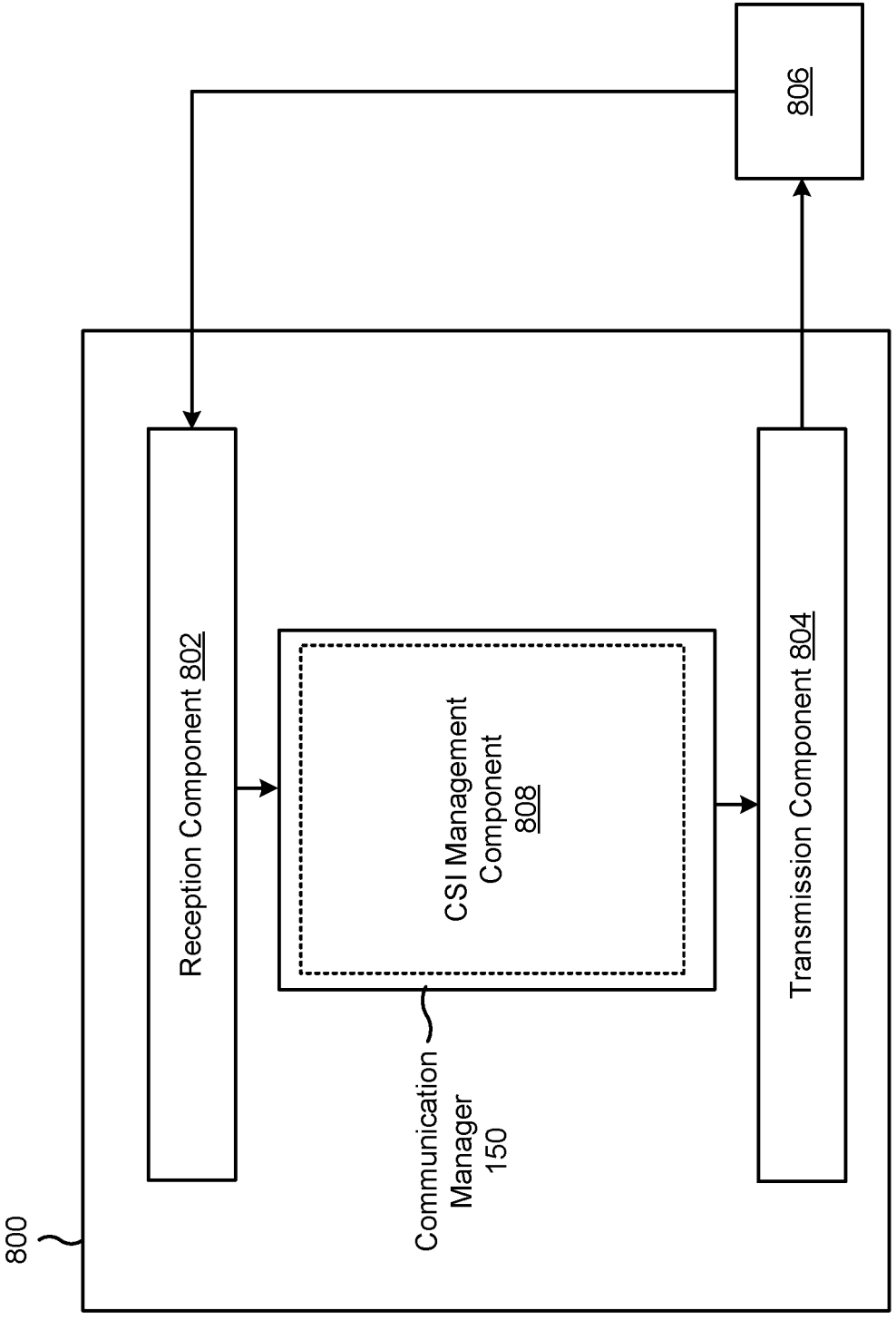

FIG. 8 is a diagram of an example apparatus 800 for wireless communication. The apparatus 800 may be a network node, or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a CSI management component 808, among other examples.

In some aspects, the apparatus 800 may be configured to perform one or more operations described herein in connection with FIGS. 4A-4K. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit a channel state information reference signal for a downlink cell associated with a first PUCCH group. The reception component 802 may receive a report of measurement information associated with channel state information reference signal using an uplink cell of a second PUCCH group associated with the first PUCCH group. The CSI management component 808 may schedule transmission of one or more CSI-RSs and reporting of the one or more CSI-RSs on one or more channels of one or more PUCCH groups.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
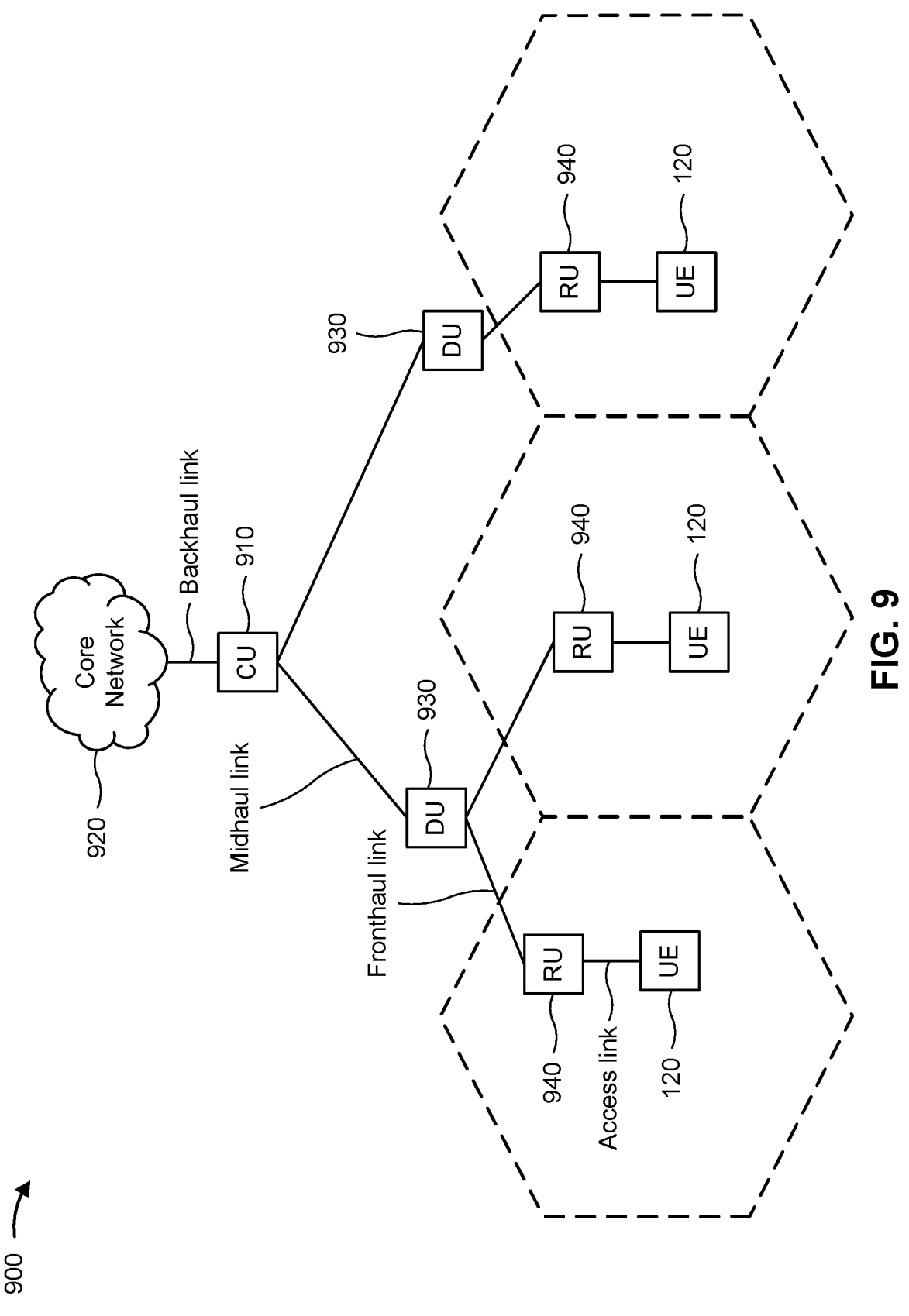
FIG. 9 is a diagram of an example disaggregated base station architecture, in accordance with the present disclosure.

FIG. 9 is a diagram illustrating an example 900 of an O-RAN architecture, in accordance with the present disclosure. As shown in FIG. 9, the O-RAN architecture may include a control unit (CU) 910 that communicates with a core network 920 via a backhaul link. Furthermore, the CU 910 may communicate with one or more DUs 930 via respective midhaul links. The DUs 930 may each communicate with one or more RUs 940 via respective fronthaul links, and the RUs 940 may each communicate with respective UEs 120 via radio frequency (RF) access links. The DUs 930 and the RUs 940 may also be referred to as O-RAN DUs (O-DUs) 930 and O-RAN RUs (O-RUs) 940, respectively.

In some aspects, the DUs 930 and the RUs 940 may be implemented according to a functional split architecture in which functionality of a base station 110 (e.g., an eNB or a gNB) is provided by a DU 930 and one or more RUs 940 that communicate over a fronthaul link. Accordingly, as described herein, a base station 110 may include a DU 930 and one or more RUs 940 that may be co-located or geographically distributed. In some aspects, the DU 930 and the associated RU(s) 940 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 930 may correspond to a logical unit that includes one or more base station functions to control the operation of one or more RUs 940. For example, in some aspects, the DU 930 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 910. The RU(s) 940 controlled by a DU 930 may correspond to logical nodes that host RF processing functions and low-PHY layer functions (e.g., fast Fourier transform (FFT), inverse FFT (iFFT), digital beamforming, and/or PRACH extraction and filtering) based at least in part on the lower layer functional split. Accordingly, in an O-RAN architecture, the RU(s) 940 handle all over the air (OTA) communication with a UE 120, and real-time and non-real-time aspects of control and user plane communication with the RU(s) 940 are controlled by the corresponding DU(s) 930, which enables the DU(s) 930 and the CU 910 to be implemented in a cloud-based RAN architecture.

As indicated above, FIG. 9 is provided as an example. Other examples may differ from what is described with regard to FIG. 9.

The following provides an overview of some Aspects of the present disclosure:

Aspect 1: A method of wireless communication performed by a user equipment (UE), comprising: measuring a channel state information reference signal for a downlink cell associated with a first physical uplink control channel (PUCCH) group; and reporting measurement information associated with channel state information reference signal using an uplink cell of a second PUCCH group associated with the first PUCCH group.

Aspect 2: The method of Aspect 1, wherein one of the first PUCCH group and the second PUCCH group is a primary PUCCH group and another of the first PUCCH group and the second PUCCH group is a secondary PUCCH group.

Aspect 3: The method of any of Aspects 1 to 2, wherein the measurement information is multiplexed with another communication on the uplink cell of the second PUCCH group.

Aspect 4: The method of any of Aspects 1 to 3, wherein a configuration of reporting the measurement information is based at least in part on radio resource control signaling.

Aspect 5: The method of any of Aspects 1 to 4, wherein the channel state information reference signal is associated with an aperiodic channel state information report or a semi-persistent channel state information report.

Aspect 6: The method of Aspect 5, wherein reporting the measurement information comprises: reporting the measurement information on a physical uplink shared channel.

Aspect 7: The method of Aspect 6, wherein reporting the measurement information comprises: multiplexing the measurement information with uplink control information on a per PUCCH group basis.

Aspect 8: The method of Aspect 7, wherein the uplink control information includes hybrid automatic repeat request feedback associated with the second PUCCH group.

Aspect 9: The method of any of Aspects 1 to 4, wherein the channel state information reference signal is associated with a periodic channel state information report or a semi-persistent channel state information report.

Aspect 10: The method of Aspect 9, wherein reporting the measurement information comprises: reporting the measurement information on a physical uplink control channel.

Aspect 11: The method of Aspect 10, wherein reporting the measurement information comprises: multiplexing the measurement information with uplink control information on a per PUCCH group basis.

Aspect 12: The method of any of Aspects 1 to 4, wherein the measurement information is a first aperiodic channel state information reference signal report associated with a first PUCCH group; and wherein reporting of the first aperiodic channel state information reference signal report is in a first time resource that is disjoint from a second time resource for reporting of a second aperiodic channel state information reference signal report associated with a second PUCCH group.

Aspect 13: The method of any of Aspects 1 to 4, wherein the measurement information is a periodic channel state information reference signal report associated with a first PUCCH group; and wherein reporting of the periodic channel state information reference signal report is in a first time resource that is at least partially overlapping with a second time resource reporting of an aperiodic channel state information reference signal report associated with a second PUCCH group.

Aspect 14: The method of any of Aspects 1 to 4, wherein the measurement information is a first periodic channel state information reference signal report associated with a first PUCCH group; and wherein reporting of the first periodic channel state information reference signal report is in a first time resource that is at least partially overlapping from a second time resource reporting of a second periodic channel state information reference signal report associated with a second PUCCH group.

Aspect 15: The method of any of Aspects 1 to 14, wherein a measurement of the channel state information reference signal for the downlink cell in the first PUCCH group is associated with a channel state information report on at least one PUCCH or physical uplink shared channel (PUSCH) of at least one of the first PUCCH group or the second PUCCH group.

Aspect 16: The method of any of Aspects 1 to 15, wherein a report of at least one measurement of at least one channel state information reference signal for at least one downlink cell in at least one of the first PUCCH group or the second PUCCH group is reported on a physical uplink shared channel of an uplink cell associated with the first PUCCH group, wherein a hybrid automatic repeat request feedback message for the downlink cell is multiplexed with the report on the physical uplink shared channel of the uplink cell.

Aspect 17: The method of any of Aspects 1 to 16, further comprising: dropping at least one communication in connection with reporting the measurement information.

Aspect 18: The method of Aspect 17, wherein dropping the at least one communication comprises: dropping the at least one communication based at least in part on a PUCCH group of the at least one communication.

Aspect 19: A method of wireless communication performed by a network node, comprising: transmitting a channel state information reference signal for a downlink cell associated with a first physical uplink control channel (PUCCH) group; and receiving a report of measurement information associated with channel state information reference signal using an uplink cell of a second PUCCH group associated with the first PUCCH group.

Aspect 20: The method of Aspect 19, wherein one of the first PUCCH group and the second PUCCH group is a primary PUCCH group and another of the first PUCCH group and the second PUCCH group is a secondary PUCCH group.

Aspect 21: The method of any of Aspects 19 to 20, wherein the measurement information is multiplexed with another communication on the uplink cell of the second PUCCH group.

Aspect 22: The method of any of Aspects 19 to 21, wherein a configuration of the report of the measurement information is based at least in part on radio resource control signaling.

Aspect 23: The method of any of Aspects 19 to 22, wherein the channel state information reference signal is associated with an aperiodic channel state information report or a semi-persistent channel state information report.

Aspect 24: The method of Aspect 23, wherein receiving the report of the measurement information comprises: receiving the report of the measurement information on a physical uplink shared channel.

Aspect 25: The method of Aspect 24, wherein receiving the report of the measurement information comprises: receiving the report of the measurement information multiplexed with uplink control information on a per PUCCH group basis.

Aspect 26: The method of Aspect 25, wherein the uplink control information includes hybrid automatic repeat request feedback associated with the second PUCCH group.

Aspect 27: The method of any of Aspects 19 to 22, wherein the channel state information reference signal is associated with a periodic channel state information report or a semi-persistent channel state information report.

Aspect 28: The method of Aspect 27, wherein receiving the report of the measurement information comprises: receiving the report of the measurement information on a physical uplink control channel.

Aspect 29: The method of Aspect 28, wherein receiving the report of the measurement information comprises: receiving the report of the measurement information multiplexed with uplink control information on a per PUCCH group basis.

Aspect 30: The method of any of Aspects 19 to 22, wherein the measurement information includes a first report of a first aperiodic channel state information reference signal associated with a first PUCCH group; and wherein the first report of the first aperiodic channel state information reference signal is in a first time resource that is disjoint from a second time resource for a second report of a second aperiodic channel state information reference signal associated with a second PUCCH group.

Aspect 31: The method of any of Aspects 19 to 22, wherein the measurement information includes a periodic channel state information reference signal report associated with a first PUCCH group; and wherein the periodic channel state information reference signal report is in a first time resource that is at least partially overlapping with a second time resource that conveys an aperiodic channel state information reference signal report associated with a second PUCCH group.

Aspect 32: The method of any of Aspects 19 to 22 wherein the measurement information includes a first periodic channel state information reference signal report associated with a first PUCCH group; and wherein the first periodic channel state information reference signal report is conveyed in a first time resource that is at least partially overlapping from a second time resource that conveys a second periodic channel state information reference signal report associated with a second PUCCH group.

Aspect 33: The method of any of Aspects 19 to 32, wherein a measurement of the channel state information reference signal for the downlink cell in the first PUCCH group is associated with a channel state information report on at least one PUCCH or physical uplink shared channel (PUSCH) of at least one of the first PUCCH group or the second PUCCH group.

Aspect 34: The method of any of Aspects 19 to 33, wherein at least one measurement of at least one channel state information reference signal for at least one downlink cell in at least one of the first PUCCH group or the second PUCCH group is reported on a physical uplink shared channel of an uplink cell associated with the first PUCCH group, wherein a hybrid automatic repeat request feedback message for the downlink cell is multiplexed with the at least one measurement on the physical uplink shared channel of the uplink cell.

Aspect 35: The method of any of Aspects 19 to 34, wherein at least one communication is dropped in connection with the report of the measurement information.

Aspect 36: The method of Aspect 35, the at least one communication is dropped based at least in part on a PUCCH group of the at least one communication.

Aspect 37: An apparatus for wireless communication at a device, comprising a processor; memory coupled with the processor; and instructions stored in the memory and executable by the processor to cause the apparatus to perform the method of one or more of Aspects 1-18.

Aspect 38: A device for wireless communication, comprising a memory and one or more processors coupled to the memory, the one or more processors configured to perform the method of one or more of Aspects 1-18.

Aspect 39: An apparatus for wireless communication, comprising at least one means for performing the method of one or more of Aspects 1-18.

Aspect 40: A non-transitory computer-readable medium storing code for wireless communication, the code comprising instructions executable by a processor to perform the method of one or more of Aspects 1-18.

Aspect 41: A non-transitory computer-readable medium storing a set of instructions for wireless communication, the set of instructions comprising one or more instructions that, when executed by one or more processors of a device, cause the device to perform the method of one or more of Aspects 1-18.

Aspect 42: An apparatus for wireless communication at a device, comprising a processor; memory coupled with the processor; and instructions stored in the memory and executable by the processor to cause the apparatus to perform the method of one or more of Aspects 19-36.

Aspect 43: A device for wireless communication, comprising a memory and one or more processors coupled to the memory, the one or more processors configured to perform the method of one or more of Aspects 19-36.

Aspect 44: An apparatus for wireless communication, comprising at least one means for performing the method of one or more of Aspects 19-36.

Aspect 45: A non-transitory computer-readable medium storing code for wireless communication, the code comprising instructions executable by a processor to perform the method of one or more of Aspects 19-36.

Aspect 46: A non-transitory computer-readable medium storing a set of instructions for wireless communication, the set of instructions comprising one or more instructions that, when executed by one or more processors of a device, cause the device to perform the method of one or more of Aspects 19-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to:

measure a channel state information reference signal for a downlink cell associated with a first physical uplink control channel (PUCCH) group, wherein the channel state information reference signal is associated with a channel state information report, the channel state information report comprising a semi-persistent channel state information report, and wherein the UE is configured to utilize cross PUCCH group channel state information reporting based at least in part on a type of the channel state information report; and report, during a secondary cell (SCell) activation procedure, measurement information associated with the channel state information reference signal using an uplink cell of a second PUCCH group associated with the first PUCCH group.

2. The UE of claim 1, wherein one of the first PUCCH group and the second PUCCH group is a primary PUCCH group and another of the first PUCCH group and the second PUCCH group is a secondary PUCCH group.

3. The UE of claim 1, wherein the measurement information is multiplexed with another communication on the uplink cell of the second PUCCH group.

4. The UE of claim 1, wherein a configuration of reporting the measurement information is based at least in part on radio resource control signaling.

5. The UE of claim 1, wherein the one or more processors, to report the measurement information, are configured to:

report the measurement information on a physical uplink shared channel.

6. The UE of claim 5, wherein the one or more processors, to report the measurement information, are configured to:

multiplex the measurement information with uplink control information on a per PUCCH group basis.

7. The UE of claim 6, wherein the uplink control information includes hybrid automatic repeat request feedback associated with the second PUCCH group.

8. The UE of claim 1, wherein the one or more processors, to report the measurement information, are configured to:

report the measurement information on a physical uplink control channel.

9. The UE of claim 8, wherein the one or more processors, to report the measurement information, are configured to:

multiplex the measurement information with uplink control information on a per PUCCH group basis.

10. The UE of claim 1, wherein the measurement information is the channel state information report, wherein the channel state information report is associated with the first PUCCH group, and wherein reporting of the channel state information report is in a first time resource that is disjointed from a second time resource for reporting of another channel state information report associated with the second PUCCH group.

11. The UE of claim 1, wherein the measurement information is the channel state information report, wherein the channel state information report is associated with the first PUCCH group, and wherein reporting of the channel state information report is in a first time resource that is at least partially overlapping with a second time resource reporting of an aperiodic channel state information report associated with the second PUCCH group.

12. The UE of claim 1, wherein the measurement information is the channel state information report, wherein the channel state information report is associated with the first PUCCH group, and wherein reporting of the channel state information report is in a first time resource that is at least partially overlapping with a second time resource reporting of another channel state information report associated with the second PUCCH group.

13. The UE of claim 1, wherein the measurement of the channel state information reference signal for the downlink cell associated with the first PUCCH group is associated with the channel state information report, and wherein the channel state information report is on at least one PUCCH or physical uplink shared channel (PUSCH) of at least one of the first PUCCH group or the second PUCCH group.

14. The UE of claim 1, wherein a report of at least one measurement of at least one channel state information reference signal for at least one downlink cell in at least one of the first PUCCH group or the second PUCCH group is reported on a physical uplink shared channel of an uplink cell associated with the first PUCCH group, wherein a hybrid automatic repeat request feedback message for the downlink cell is multiplexed with the report on the physical uplink shared channel of the uplink cell associated with the first PUCCH group.

15. The UE of claim 1, wherein the one or more processors are further configured to:
   drop at least one communication in connection with reporting the measurement information.

16. The UE of claim 15, wherein the one or more processors, to drop the at least one communication, are configured to:
   drop the at least one communication based at least in part on a PUCCH group of the at least one communication.

17. A network node for wireless communication, comprising:
   one or more memories; and
   one or more processors, coupled to the one or more memories, configured to:
      transmit a channel state information reference signal for a downlink cell associated with a first physical uplink control channel (PUCCH) group, wherein the channel state information reference signal is associated with a channel state information report, the channel state information report comprising a semi-persistent channel state information report, and wherein the network node configures a user equipment (UE) to utilize cross PUCCH group channel state information reporting based at least in part on a type of the channel state information report; and
      receive, during a secondary cell (SCell) activation procedure, a report of measurement information associated with the channel state information reference signal using an uplink cell of a second PUCCH group associated with the first PUCCH group.

18. The network node of claim 17, wherein one of the first PUCCH group and the second PUCCH group is a primary PUCCH group and another of the first PUCCH group and the second PUCCH group is a secondary PUCCH group.

19. The network node of claim 17, wherein the measurement information is multiplexed with another communication on the uplink cell of the second PUCCH group.

20. The network node of claim 17, wherein a configuration of the report of the measurement information is based at least in part on radio resource control signaling.

21. The network node of claim 17, wherein the one or more processors, to receive the report of the measurement information, are configured to:
   receive the report of the measurement information on a physical uplink shared channel.

22. The network node of claim 21, wherein the one or more processors, to receive the report of the measurement information, are configured to:
   receive the report of the measurement information multiplexed with uplink control information on a per PUCCH group basis.

23. The network node of claim 22, wherein the uplink control information includes hybrid automatic repeat request feedback associated with the second PUCCH group.

24. The network node of claim 17, wherein the one or more processors, to receive the report of the measurement information, are configured to:
   receive the report of the measurement information on a physical uplink control channel.

25. A method of wireless communication performed by a user equipment (UE), comprising:

measuring a channel state information reference signal for a downlink cell associated with a first physical uplink control channel (PUCCH) group, wherein the channel state information reference signal is associated with a channel state information report, the channel state information report comprising a semi-persistent channel state information report, and wherein the UE is configured to utilize cross PUCCH group channel state information reporting based at least in part on a type of the channel state information report; and
   reporting, during a secondary cell (SCell) activation procedure, measurement information associated with the channel state information reference signal using an uplink cell of a second PUCCH group associated with the first PUCCH group.

26. A method of wireless communication performed by a network node, comprising:
   transmitting a channel state information reference signal for a downlink cell associated with a first physical uplink control channel (PUCCH) group, wherein the channel state information reference signal is associated with a channel state information report, the channel state information report comprising a semi-persistent channel state information report, and wherein the network node configures a user equipment (UE) to utilize cross PUCCH group channel state information reporting based at least in part on a type of the channel state information report; and
   receiving, during a secondary cell (SCell) activation procedure, a report of measurement information associated with the channel state information reference signal using an uplink cell of a second PUCCH group associated with the first PUCCH group.

27. The network node of claim 17, wherein the measurement information is the channel state information report, wherein the channel state information report is associated with the first PUCCH group, and wherein the channel state information report is in a first time resource that is disjointed from a second time resource for reporting of another channel state information report associated with the second PUCCH group.

28. The network node of claim 17, wherein the measurement information is the channel state information report, wherein the channel state information report is associated with the first PUCCH group, and wherein the channel state information report is in a first time resource that is at least partially overlapping with a second time resource reporting of an aperiodic channel state information report associated with the second PUCCH group.

29. The network node of claim 17, wherein the measurement information is the channel state information report, wherein the channel state information report is associated with the first PUCCH group, and wherein the channel state information report is in a first time resource that is at least partially overlapping with a second time resource reporting of another channel state information report associated with the second PUCCH group.

30. The network node of claim 17, wherein a measurement of the channel state information reference signal for the downlink cell associated with the first PUCCH group is associated with the channel state information report, and wherein the channel state information report is on at least one PUCCH or physical uplink shared channel (PUSCH) of at least one of the first PUCCH group or the second PUCCH group.

* * * * *